(12) United States Patent
Nagatoshi

(10) Patent No.: US 12,710,642 B2
(45) Date of Patent: Aug. 18, 2026

(54) OPTICAL SCANNING DEVICE AND IMAGE FORMING APPARATUS

(71) Applicant: CANON KABUSHIKI KAISHA, Tokyo (JP)

(72) Inventor: Jun Nagatoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 18/507,666

(22) Filed: Nov. 13, 2023

(65) Prior Publication Data

US 2024/0201487 A1 Jun. 20, 2024

(30) Foreign Application Priority Data

Dec. 19, 2022 (JP) ................................ 2022-201923

(51) Int. Cl.
*G02B 27/00* (2006.01)
*G02B 26/12* (2006.01)
*G03G 15/043* (2006.01)

(52) U.S. Cl.
CPC ....... *G02B 27/0031* (2013.01); *G02B 26/125* (2013.01); *G03G 15/043* (2013.01)

(58) Field of Classification Search
CPC ............. G02B 27/0031; G02B 26/125; G02B 26/127; G02B 26/08; G02B 26/0816–0866; G02B 13/0005; G02B 26/12–128; G03G 15/043
See application file for complete search history.

(56) References Cited

U.S. PATENT DOCUMENTS 5,309,270 A 5/1994 Yamakawa ............ G02B 26/10
5,369,272 A 11/1994 Eguchi ................... G02B 26/10
6,992,689 B2 * 1/2006 Yamaguchi .......... G02B 26/124
347/250

(Continued)

FOREIGN PATENT DOCUMENTS

JP H05-215981 8/1993
JP H05-304595 11/1993

(Continued)

OTHER PUBLICATIONS

Extended European Search Report dated Apr. 2, 2024 in counterpart EP Application No. 23209999.4.

*Primary Examiner* — Thomas K Pham
*Assistant Examiner* — Ruby L Kauffman
(74) *Attorney, Agent, or Firm* — Venable LLP

(57) ABSTRACT

An optical scanning device includes a light source, a rotatable polygon mirror, an optical member, an output portion and a detector. The optical member guides the luminous flux scanned by the rotatable polygon mirror to an image bearing member. The output portion is provided on an upstream side of the optical member in the scanning direction and outputs a signal corresponding to receiving the luminous flux. The detector is provided on the upstream side of the output portion and detects a light quantity of the luminous flux. A controller controls the light source based on the signal outputted from the output portion and the light quantity detected by the detector. The luminous flux reaching the detector is reflected at a position closer to an end portion of a reflecting surface of the rotatable polygon mirror in the main scanning direction than the luminous flux reaching the output portion.

15 Claims, 8 Drawing Sheets

(56) References Cited

U.S. PATENT DOCUMENTS

| | | | | |
|---|---|---|---|---|
| 7,436,564 | B2 * | 10/2008 | Gomi | G02B 27/0031 250/236 |
| 7,466,333 | B2 | 12/2008 | Kato | B41J 2/435 |
| 8,072,667 | B2 | 12/2011 | Suzuki et al. | G02B 26/10 |
| 2007/0081071 | A1 | 4/2007 | Kato | B41J 2/47 |
| 2008/0049797 | A1 | 2/2008 | Morisawa et al. | H01S 3/10 |
| 2009/0195635 | A1 | 8/2009 | Ishida et al. | B41J 15/14 |
| 2012/0050444 | A1 | 3/2012 | Sakai | B41J 2/415 |
| 2014/0160217 | A1 | 6/2014 | Nagatoshi et al. | B41J 2/385 |
| 2014/0210927 | A1 * | 7/2014 | Hwang | H04N 1/0473 347/118 |
| 2014/0225974 | A1 * | 8/2014 | Park | G03G 15/04045 347/224 |
| 2017/0142283 | A1 | 5/2017 | Tanaka et al. | H04N 1/113 |
| 2020/0103784 | A1 | 4/2020 | Nagatoshi | G03G 15/043 |
| 2020/0310276 | A1 | 10/2020 | Katayama et al. | G03G 15/04 |
| 2021/0033852 | A1 | 2/2021 | Sano et al. | G02B 26/12 |

FOREIGN PATENT DOCUMENTS

| | | |
|---|---|---|
| JP | 2002-023082 | 1/2002 |
| JP | 2007-108298 | 4/2007 |
| JP | 6736368 B2 | 8/2020 |

* cited by examiner (a)

(b)

OPTICAL SCANNING DEVICE AND IMAGE FORMING APPARATUS

FIELD OF THE INVENTION RELATED ART

The present invention relates to an optical scanning device and an image forming apparatus. For example, the present invention relates to an optical scanning apparatus that uses a laser beam to write light in an image forming apparatus such as a laser beam printer (LBP), digital copier, or digital FAX machine.

The optical scanning device modulates a laser luminous flux emitted from a light source in response to an image signal and deflects and scans the light-modulated laser luminous flux by means of an optical deflector having, for example, a rotatable polygon mirror. The deflected and scanned laser luminous flux is guided to a beam detector (hereinafter referred to as BD) to control the timing of the scanning start position on the scanned surface. The BD outputs a signal when it detects a laser luminous flux. For example, an optical scanning device performs image recording by optical scanning of a laser luminous flux onto a photosensitive member in the form of a spot image by means of a scanning lens such as an imaging optical system having fθ characteristics. The fθ lens has lens characteristics (fθ characteristics) such that when the laser luminous flux enters at an angle θ, it forms an image of size (f×θ) multiplied by the focal length f of the fθ lens. In this case, the optical scanning device writes out the image after a predetermined time based on the signal output from the BD (see, for example, Japanese Patent No. 6736368).

However, with conventional technology, toner, paper dust, and dust in the air may enter an optical box through gaps between the optical box and a lid. When the rotatable polygon mirror is rotated at high speed in this state, dust adheres to an edge of each reflecting surface of the rotatable polygon mirror in a rotational direction. The adhered dust reduces a light quantity at the beginning and end of writing in an image area. As the light quantity decreases, a density at an edge of the image becomes lighter, resulting in uneven image density. When rotating the rotatable polygon mirror at high speed, heat generated by coils and electric circuits that rotate the rotatable polygon mirror causes the optical box to expand and deform due to the heat. The deformation of the optical box changes a position and posture of optical elements placed in the optical box, and a scanning position on a scanned surface shifts from a predetermined position in a sub-scanning direction (direction orthogonal to the scanning direction). As a result, top and bottom margins on the paper surface of printed materials become wider or narrower than the predetermined value. However, while the image forming apparatus is in operation, it is not possible to detect changes over time in performance that affect image quality, such as a decrease in the reflectivity of the rotatable polygon mirror or a shift in the scanning position on the surface to be scanned.

SUMMARY OF THE INVENTION

The purpose of the present invention is to detect changes over time in the rotatable polygon mirror of an optical scanning device, even while the device is in operation, and to achieve high image quality while suppressing image degradation over time.

According to an aspect of the present invention, there is provided an optical scanning device comprising a light source configured to emit a luminous flux; a rotatable polygon mirror configured to deflect the luminous flux emitted from the light source and scan in a main scanning direction; an optical member configured to guide the luminous flux scanned by the rotatable polygon mirror to an image bearing member; an output unit provided on an upstream side of the optical member in the main scanning direction and configured to output a signal corresponding to receiving the luminous flux; a detecting unit provided on the upstream side of the output unit in the main scanning direction and configured to detect a light quantity of the luminous flux; and a control unit configured to control the light source based on the signal outputted from the output unit and the light quantity detected by the detecting unit, wherein the luminous flux reaching the detecting unit is reflected at a position closer to an end portion of a reflecting surface of the rotatable polygon mirror with respect to the main scanning direction than the luminous flux reaching the output unit.

According to another aspect of the present invention, there is provided an optical scanning device comprising: a light source configured to emit a luminous flux; a rotatable polygon mirror configured to deflect the luminous flux emitted from the light source and scan in a main scanning direction; a first optical member configured to guide the luminous flux scanned by the rotatable polygon mirror to an image bearing member; a second optical member provided on an upstream side of the first optical member in the main scanning direction; an output unit provided on the upstream side of the first optical member in the main scanning direction and configured to output a signal corresponding to receiving the luminous flux which is scanned by the rotatable polygon mirror and condensed in the main scanning direction by the second optical member; and a control unit configured to control the light source based on the signal outputted from the output unit, wherein the output unit detects a light quantity of the luminous flux which is the upstream side, in the main scanning direction, of the luminous flux condensed in the main scanning direction by the second optical member and which is not condensed in the main scanning direction, and wherein the control unit controls the light quantity of the luminous flux not condensed in the main scanning direction.

Further features of the present invention will become apparent from the following description of exemplary embodiments with reference to the attached drawings.

Figure 2:
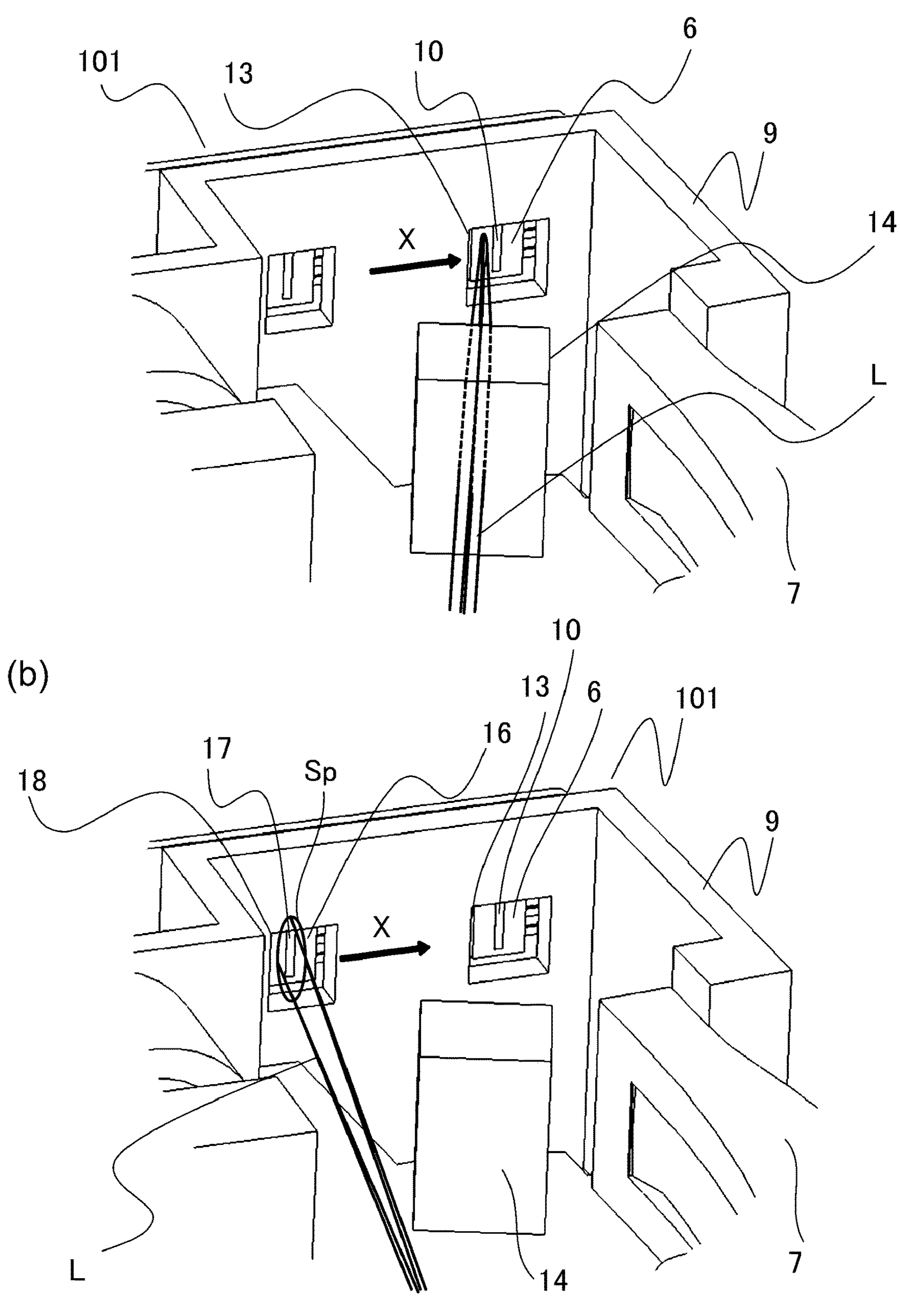

Part (a) of FIG. 2 is a partially enlarged view showing a configuration in the vicinity of the BD of the optical scanning device in embodiment 1, and part (b) of FIG. 2 is a partially enlarged view showing the configuration in the vicinity of the light quantity sensor.

Figure 3:
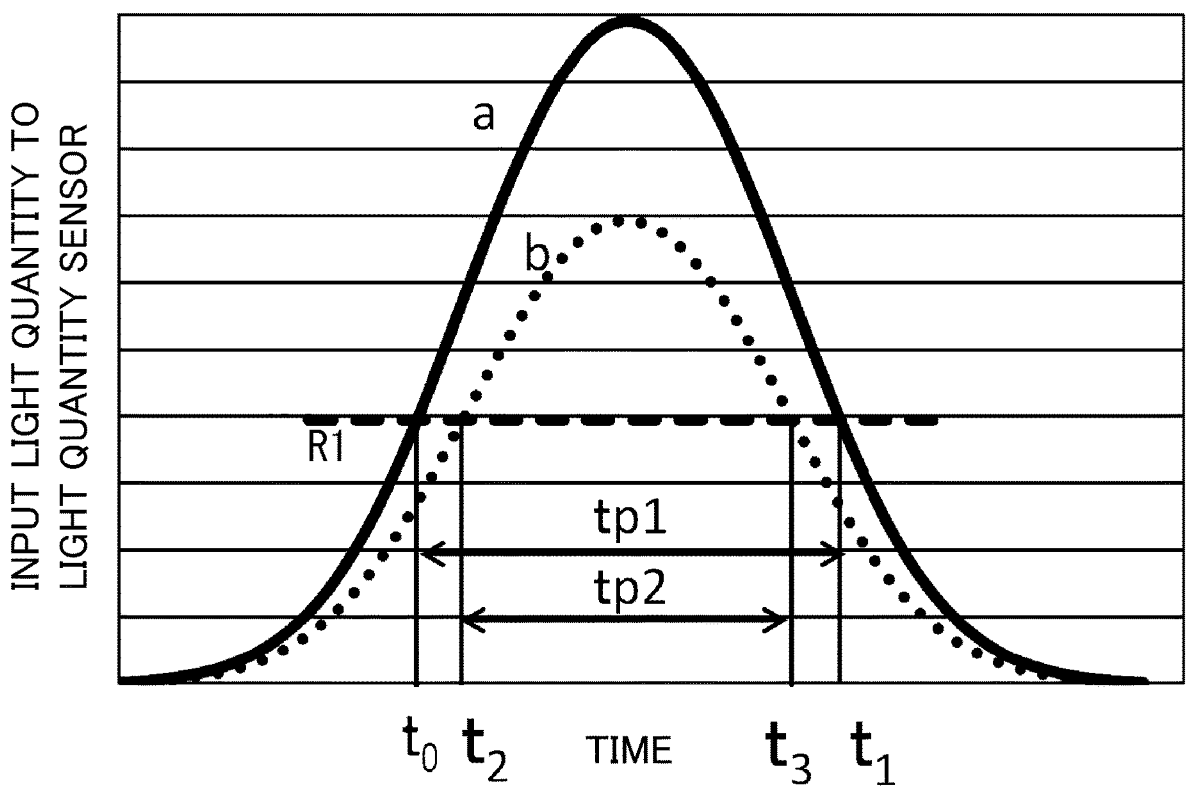

FIG. 3 is a view showing the input light quantity to the light quantity sensor of the optical scanning device according to embodiment 1.

Figure 4:
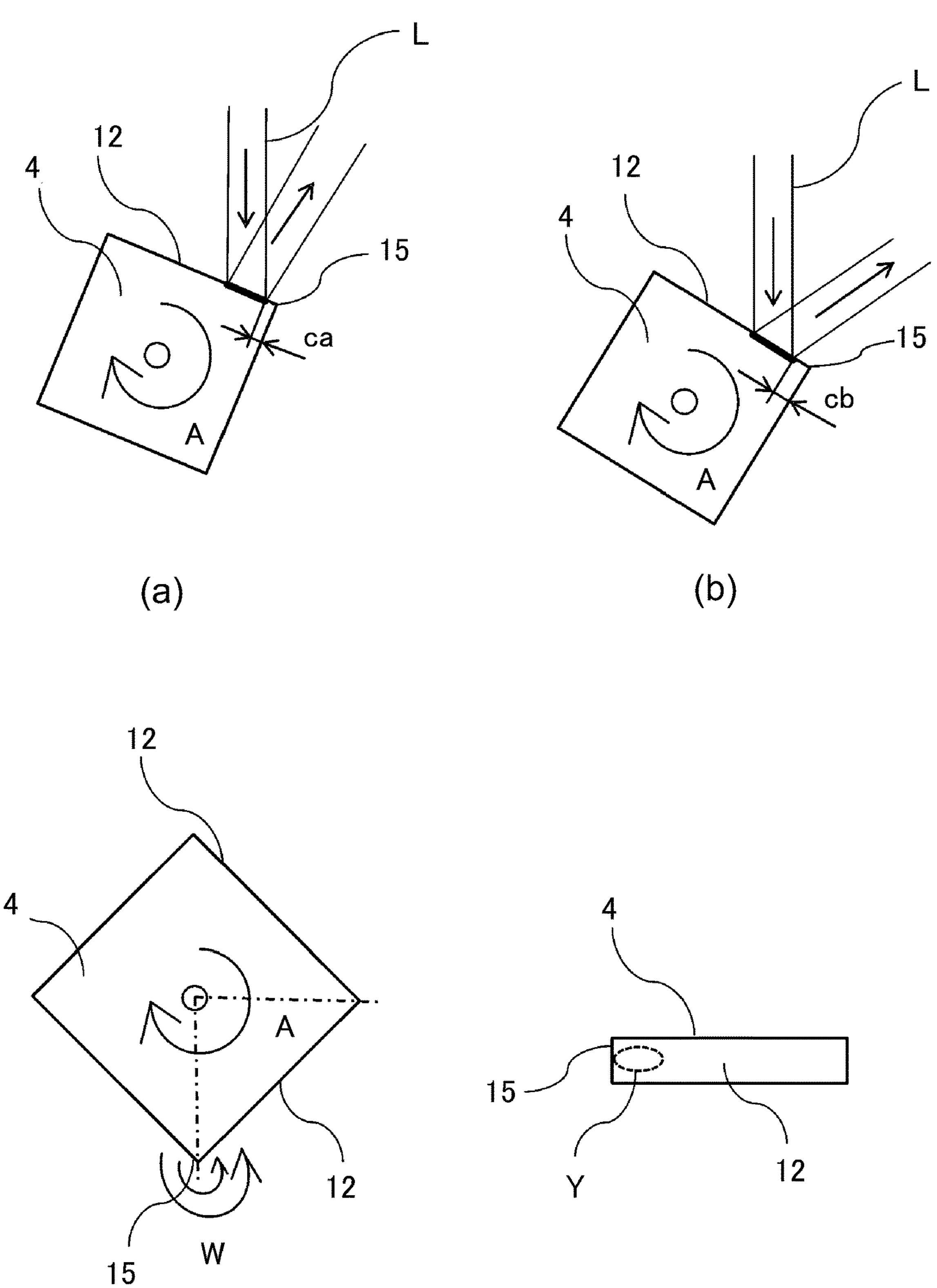

Part (a) and part (b) of FIG. 4 are schematic views showing the position of the reflected luminous flux in the rotatable polygon mirror of embodiment 1, and part (c) and part (d) of FIG. 4 are schematic views showing the position of dirt on the rotatable polygon mirror.

Figure 5:
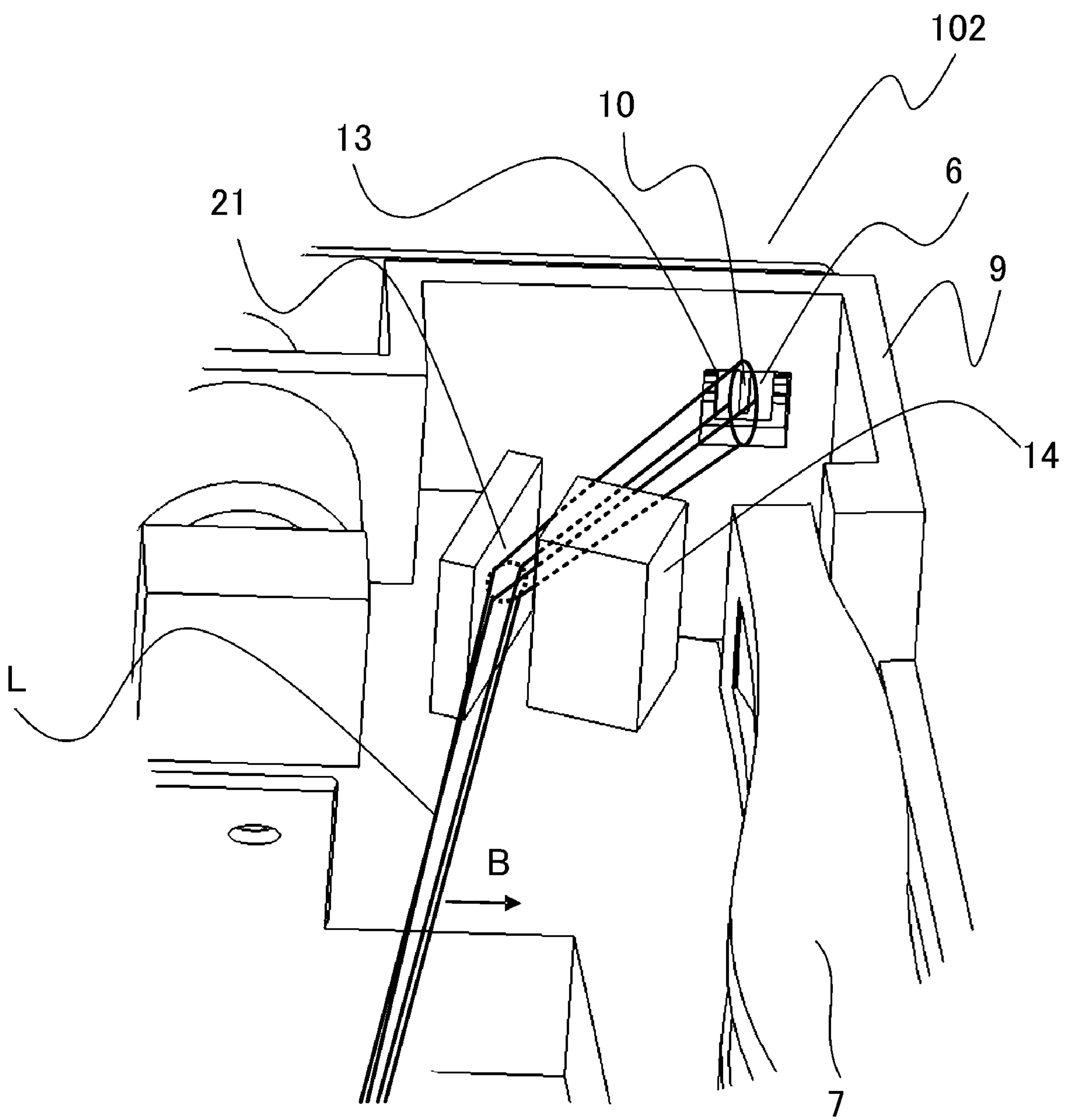

FIG. 5 is a perspective explanatory view showing the configuration of the vicinity of the BD of the optical scanning device in embodiment 2.

Figure 6:
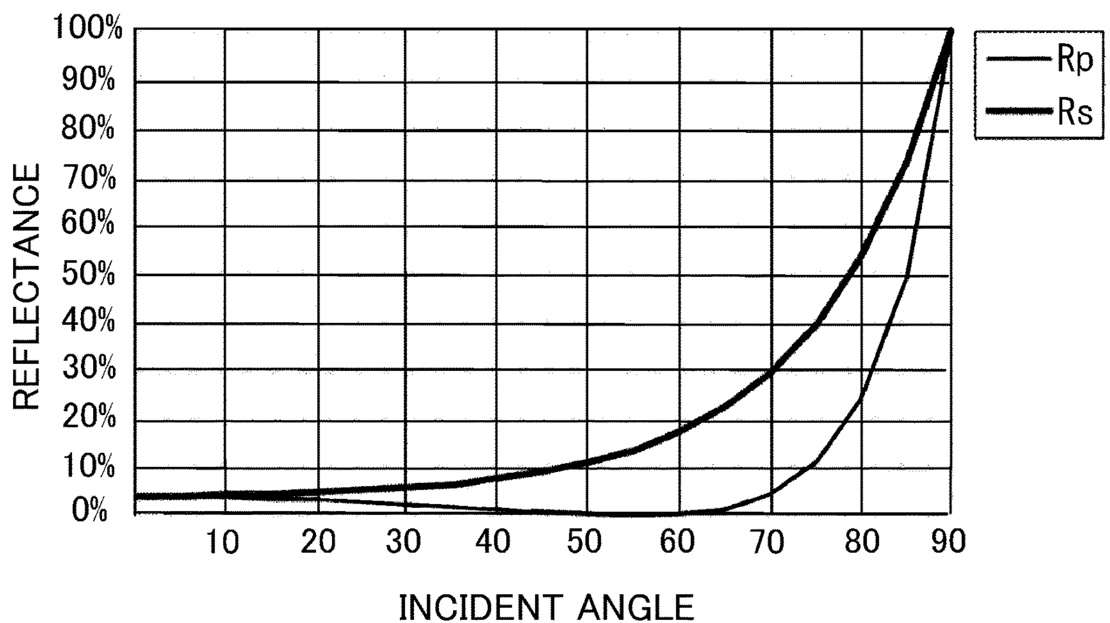
Figure 6:
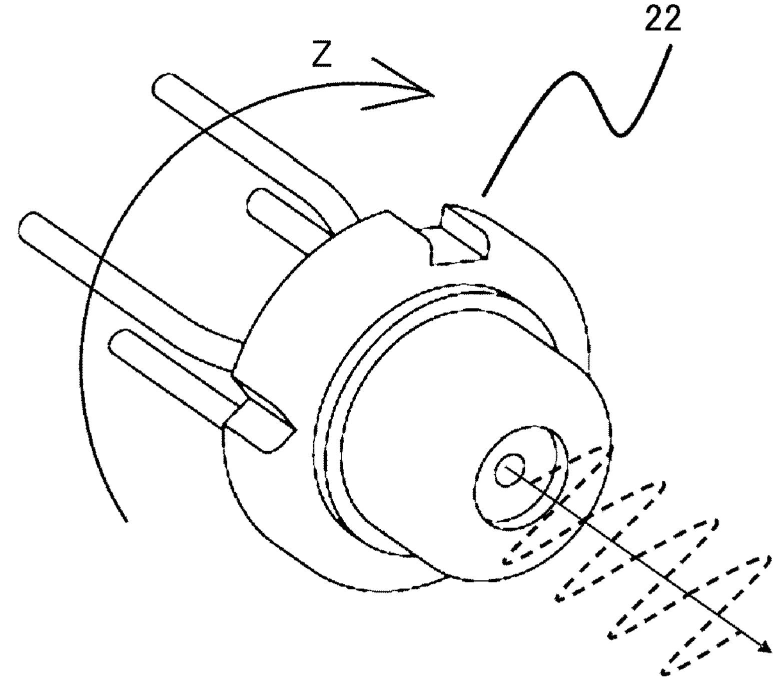

Part (a) of FIG. 6 is a graph showing the incident angle dependence of the reflectance of PMMA in embodiment 2, and part (b) of FIG. 6 is a perspective explanatory view showing a semiconductor laser.

Figure 7:
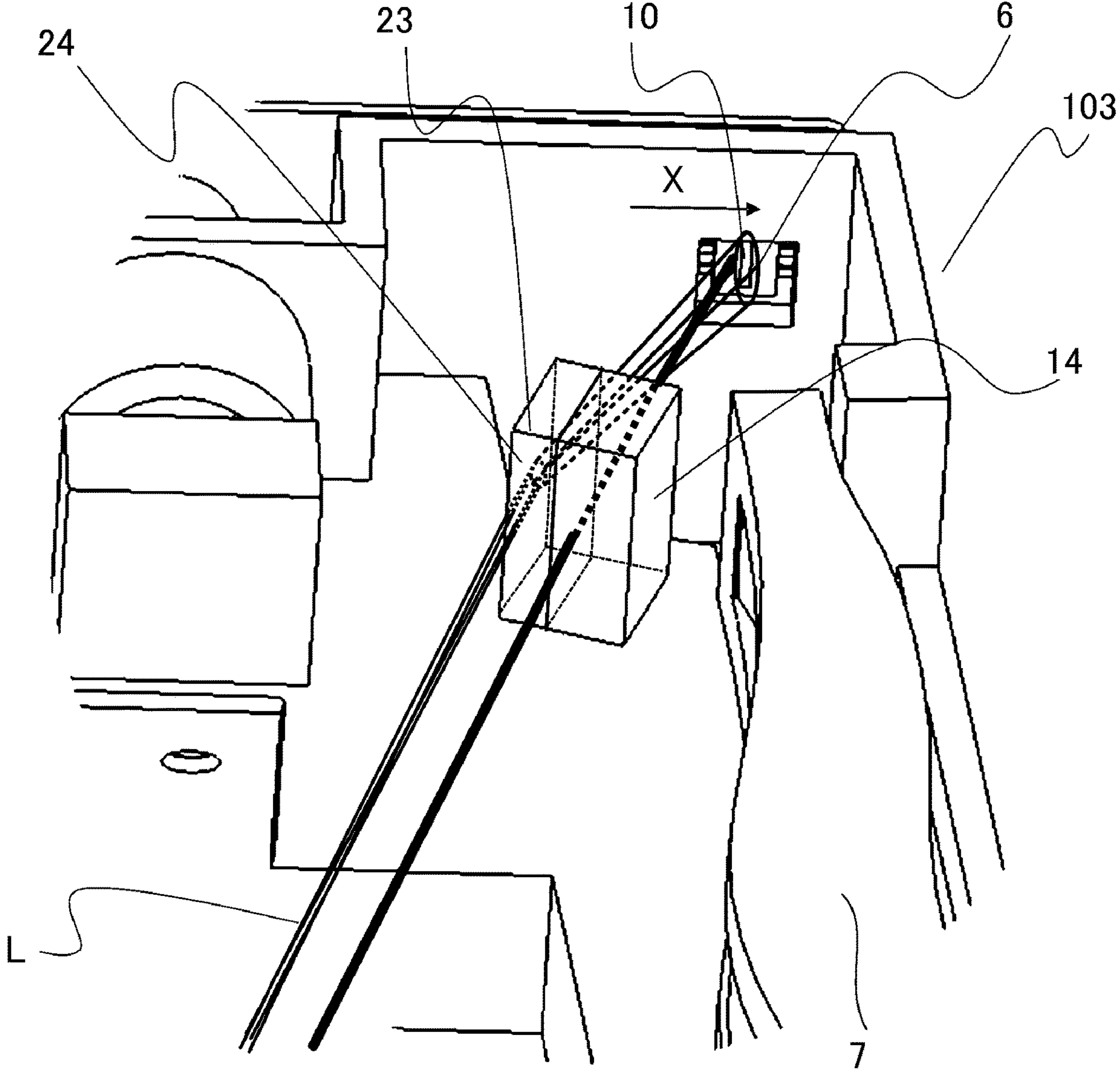

FIG. 7 is a perspective explanatory view showing the configuration in the vicinity of the BD of the optical scanning device in embodiment 3.

Figure 8:
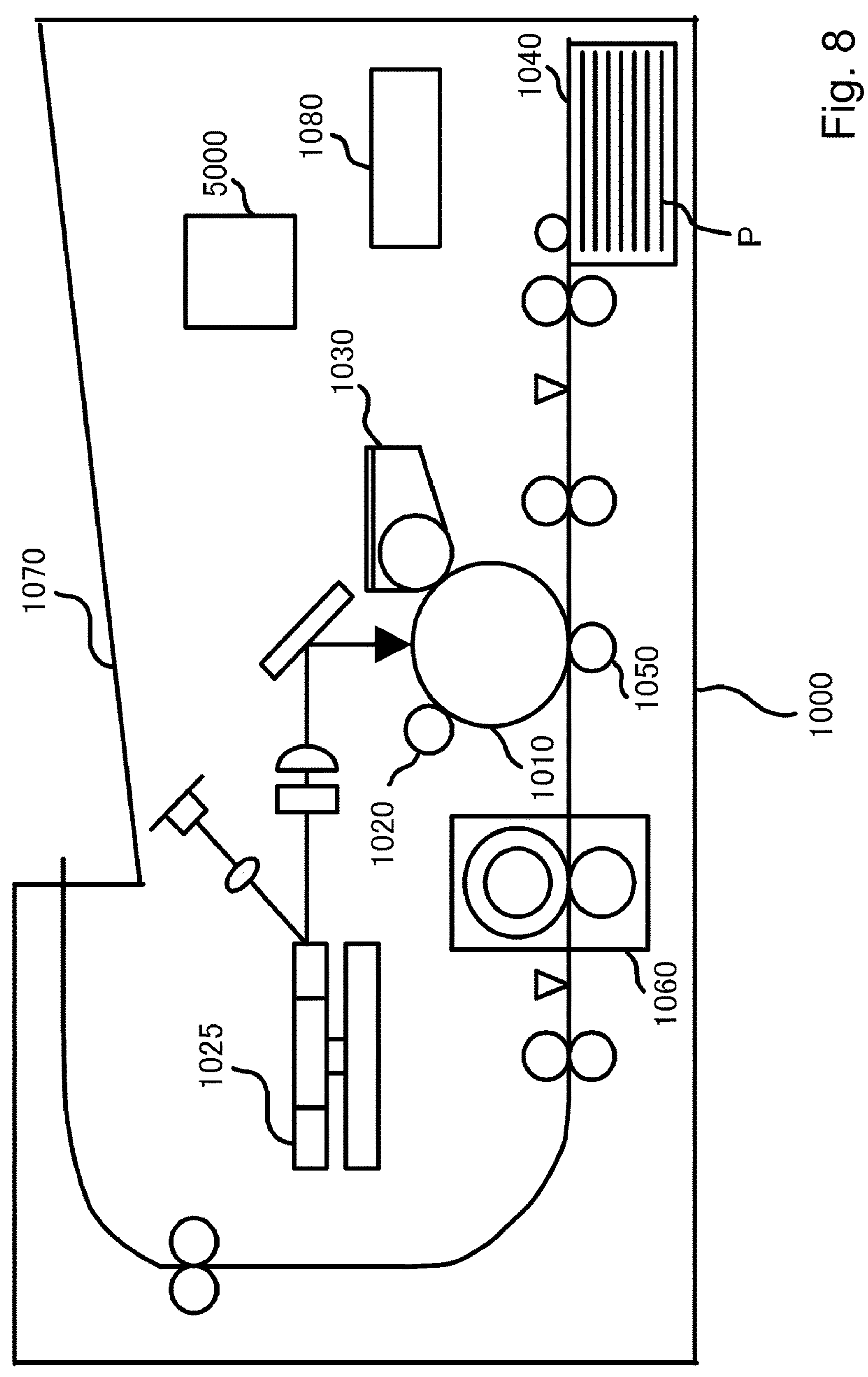

FIG. 8 is a view showing the configuration of the image forming apparatus in embodiment 4.

DESCRIPTION OF THE EMBODIMENTS

In the following explanation, a direction in which a laser beam emitted from an optical scanning device scans a photosensitive drum (or a direction of a rotational axis of the photosensitive drum) is a main scanning direction. A direction orthogonal to the main scanning direction (or a direction of rotation of the photosensitive drum) is a sub-scanning direction.

Embodiment 1

<Optical Scanning Device>

Figure 1:
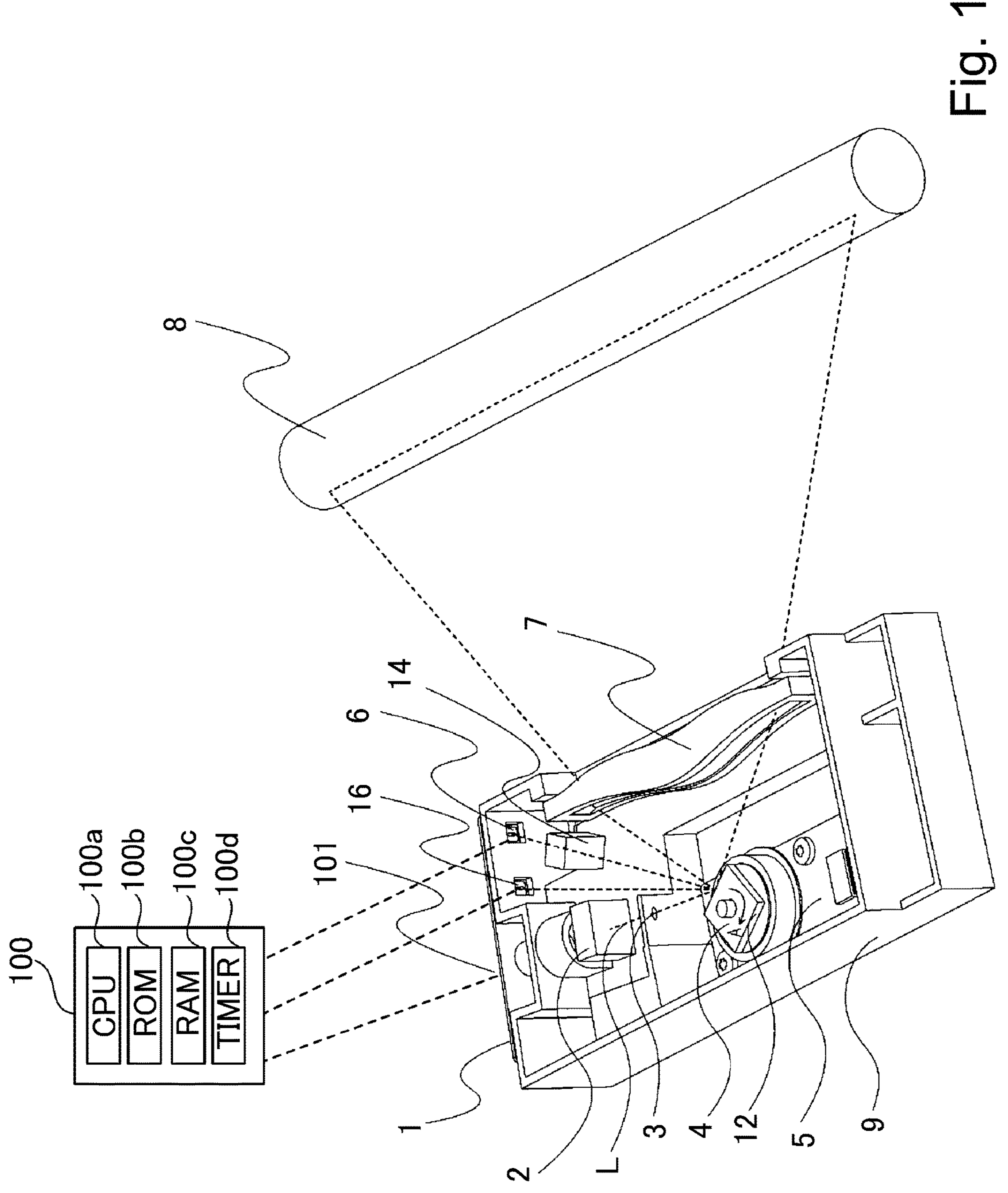
FIG. 1 is a perspective explanatory view showing Embodiment 1 configuration of an optical scanning device.

One embodiment of an optical scanning device of the present invention is specifically described using FIGS. 1 through 3. FIG. 1 is a perspective explanatory view showing the configuration of the optical scanning device of embodiment 1. An optical scanning device 101, shown in FIG. 1 performs optical writing on a surface of a photosensitive drum 8, an image bearing member, using a laser light in an image forming apparatus such as a laser beam printer (LBP), digital copier, and digital FAX machine. The optical scanning device 101 has a semiconductor laser unit 1 that serves as a light source emitting a laser luminous flux L (luminous flux) and an anamorphic collimator lens 2 integrally formed with a collimator lens and cylindrical lens.

The optical scanning device 101 also has an opening diaphragm 3 consisting of a through hole and a rotatable polygon mirror 4. The rotatable polygon mirror 4 has, for example, four reflecting surfaces 12, deflects the laser luminous flux L, and scans it in the main scanning direction. The optical scanning device 101 has an optical deflector 5 that drives the rotatable polygon mirror 4 by a driving motor (not shown). The optical scanning device 101 has a beam detector 6 (hereinafter BD 6) that detects the laser luminous flux L deflected and scanned by the optical deflector 5 to determine the writing start position of the laser luminous flux L on the surface of the photosensitive drum 8. BD 6 is provided upstream in the main scanning direction from a scanning lens 7, described below, and functions as an output unit that outputs a signal in response to receiving a laser luminous flux L. The optical scanning device 101 has a BD lens 14, which is a second optical member having an anamorphic optical surface, and a light quantity sensor 16 that detects the light quantity of the laser luminous flux L deflected and scanned by the optical deflector 5. The BD lens 14 is provided between the rotatable polygon mirror 4 and BD 6, and guides the laser luminous flux L scanned by the rotatable polygon mirror 4 to BD 6, not to the light quantity sensor 16. The light quantity sensor 16 is installed upstream in the main scanning direction from the BD 6 and functions as a detection unit for detecting the light quantity of the laser luminous flux L. The light quantity sensor 16 detects a decrease in the reflectance of the reflecting surface 12 of the rotatable polygon mirror 4 by detecting the light quantity.

The optical scanning device 101 has a scanning lens 7, which is a first optical member (optical member) having the function of an fθ lens that serves as an image forming unit for guiding the laser luminous flux L deflected and scanned by the optical deflector 5 onto the surface of the photosensitive drum 8 and forming an image. The fθ lens has lens characteristics (fθ characteristics) such that when the laser light enters at an angle θ, it forms an image of a size (f×θ) multiplied by the focal length f of the fθ lens. The optical scanning device 101 has an optical box 9 that houses each optical member including the optical deflector 5. The optical box 9 is made of black resin, for example, and formed by injection molding.

The laser luminous flux L emitted from the semiconductor laser unit 1 is made to be collimated or converged in the main scanning direction by the anamorphic collimator lens 2, and converged in the sub-scanning direction. The laser luminous flux L then passes through the opening diaphragm 3 to limit the luminous flux width and forms a focal line image extending long in the main scanning direction on the reflecting surface 12 of the rotatable polygon mirror 4.

The laser luminous flux L formed on the reflecting surface 12 of the rotatable polygon mirror 4 is deflected and scanned by rotating the rotatable polygon mirror 4. The laser luminous flux L reflected on the reflecting surface 12 scans on the light quantity sensor 16. It then enters the BD lens 14 as the rotatable polygon mirror 4 rotates and scans on the BD 6 with the light focused in the main scanning direction.

The laser luminous flux L then enters a long scanning lens 7 in the main scanning direction. The scanning lens 7, which functions as an fθ lens, is designed to focus the laser luminous flux L to form a spot on the surface of the photosensitive drum 8 and to maintain a constant spot scanning speed. To obtain such fθ lens characteristics, the scanning lens 7 is formed with an aspherical lens.

The rotation of the rotatable polygon mirror 4 deflects and scans the laser luminous flux L. Main scanning is performed by the laser luminous flux L on the surface of the photosensitive drum 8, and sub-scanning is performed by rotating and driving the photosensitive drum 8 around its axis. This forms an electrostatic latent image on the surface of the photosensitive drum 8, which is uniformly charged by a charging unit (not shown), in accordance with the image information.

A control portion 100 has a CPU 100*a*, ROM 100*b*, RAM 100*c*, and a timer 100*d*. The control portion 100 performs various controls according to programs stored in the ROM 100*b* in advance, referring to parameters, tables, etc. stored in the ROM 100*b* and the timer 100*d*, while using the RAM 100*c* as a temporary work area. BD 6 outputs a signal to the control portion 100 when a laser luminous flux L is introduced. When a laser luminous flux L is introduced, the light quantity sensor 16 outputs a signal to the control portion 100 in proportion to the amount of light introduced. The control portion 100 can also control the semiconductor laser unit 1 based on the detection results of the BD 6 and the light quantity sensor 16. The control portion 100 functions as a control unit to control the light source based on the signal output by the BD 6 and the light quantity detected by the light quantity sensor 16.

<BD>

Part (a) of FIG. 2 is a partially enlarged view of the optical scanning device 101 showing the configuration in the vicinity of BD 6. The optical scanning device 101 has a BD 6, an optical box 9, and a BD lens 14. BD 6 has a light-receiving surface 10. The optical box 9 has a through hole 13.

The laser luminous flux L reflected by the rotatable polygon mirror 4 shown in FIG. 1 passes through the BD lens 14, becomes a focused beam in the main scanning direction, and is scanned in the arrow X direction in part (a) of FIG. 2 as the rotatable polygon mirror 4 rotates in the arrow A direction (clockwise direction) in FIG. 1. The laser luminous flux L scanned in the arrow X direction in part (a) of FIG. 2 passes through the through hole 13 in the optical box 9 and enters the light-receiving surface 10 of the BD 6. At this time, the control portion 100 detects the luminous flux at BD 6, and based on the signal output from BD 6, it is used as the synchronous detection timing for the writing position in the main scanning direction on the photosensitive drum 8.

<Light Quantity Sensor>

Next, the light quantity sensor 16, which is a characteristic of Embodiment 1, is explained using part (b) of FIG. 2 through FIG. 4. Part (b) of FIG. 2 is a partially enlarged view of the configuration near the light quantity sensor 16 of the optical scanning device 101. The optical scanning device 101 has a light quantity sensor 16. The light quantity sensor 16 has a light-receiving surface 17. The optical box 9 has a through hole 18. Part (b) of FIG. 2 also shows the laser luminous flux L reflected by the reflecting surface 12 of the rotatable polygon mirror 4, which is not shown in the Figure. The light quantity sensor 16 and the through hole 18 are provided upstream of the BD 6 and the through hole 13 in the arrow X direction, in other words, in the main scanning direction.

The laser luminous flux L is scanned in the arrow X direction in part (b) of FIG. 2 as the rotatable polygon mirror 4 rotates in the arrow A direction in FIG. 1. The laser luminous flux L scanned in the arrow X direction in part (b) of FIG. 2 passes through the through hole 18 in the optical box 9 and scans on the light-receiving surface 17 of the light quantity sensor 16. After the laser luminous flux L becomes a long focal line extending in the main scanning direction on the reflecting surface 12 of the rotatable polygon mirror 4, it becomes a luminous flux that is approximately parallel or weakly convergent in the main scanning direction and spread out in the sub-scanning direction. This laser luminous flux L becomes an elliptical Sp luminous flux with a long axis of 3 mm and a short axis of 1 mm, for example, on the light-receiving surface 17 of the light quantity sensor 16.

<Detection Method for Low Reflectance of Rotatable Polygon Mirrors>

The detection method of the decrease in reflectance of the rotatable polygon mirror 4 based on the amount of light received on the light-receiving surface 17 of the light quantity sensor 16 is explained here. FIG. 3 shows the amount of light entering the light-receiving surface 17 of the laser luminous flux L on the vertical axis, with time on the horizontal axis.

(When the Reflecting Surface of the Rotatable Polygon Mirror is Clean)

The amount of light entering the light-receiving surface 17 as the laser luminous flux L scans the light quantity sensor 16 in the direction of the arrow X in part (b) of FIG. 2 is shown in graph a in FIG. 3. In graph a shown in FIG. 3, after the end of the laser luminous flux L enters the light-receiving surface 17, the amount of light entering the light-receiving surface 17 gradually increases as the laser luminous flux L travels in the arrow X direction in part (b) of FIG. 2 on the light-receiving surface 17. Then, the threshold value R1 is reached at time t0. Thereafter, after the input light quantity to the light-receiving surface 17 reaches its peak, the input light quantity to the light-receiving surface 17 gradually decreases and falls below the threshold value R1 at time t1. The threshold value R1 is an arbitrarily set value to match the maximum input light quantity to the light-receiving surface 17, for example, 20% to 50% of it.

The light quantity sensor 16 compares the input light quantity with the threshold value R1 and outputs a square wave signal, for example, to the control portion 100 while the input light quantity is greater than the threshold value R1. The pulse width of the signal at this time is tp1 (=t1−t0). The control portion 100 shall measure the pulse width tp1 with a timer 100D.

(When the Reflecting Surface of the Rotatable Polygon Mirror is Dirty)

The following explains the amount of light entering the light quantity sensor 16 of the laser luminous flux L when the reflecting surface 12 of the rotatable polygon mirror 4 is dirty. Similar to graph a, the input light quantity of the laser luminous flux L to the light-receiving surface 17 when the reflecting surface 12 is dirty is shown in FIG. 3 as graph b with a dotted line. When the laser luminous flux L scanning in the direction of the arrow X in part (b) of FIG. 2 is scanned on the light-receiving surface 17, the input light quantity to the light-receiving surface 17 gradually increases and reaches the threshold value R1 at time t2 (>t0). Thereafter, after the input light quantity to the light-receiving surface 17 reaches its peak, the input light quantity gradually decreases and falls below the threshold value R1 at time t3 (<t1). The pulse width of the input light quantity and the threshold value R1 at this time is tp2 (=t3-t2). The control portion 100 shall measure the pulse width tp2 with the timer 100*d*. The control portion 100 can detect a decrease in reflectance of the rotatable polygon mirror 4 by comparing the magnitude of the pulse width tp1 and the pulse width tp2. For example, the control portion 100 can determine that the smaller the pulse width tp2 is in relation to the pulse width tp1 (the larger the difference between tp1 and tp2), the greater the degree of contamination of the reflecting surface 12 of the rotatable polygon mirror 4.

<Reflected Position of the Laser Luminous Flux Entering the Light Quantity Sensor and BD>

Parts (a) and (b) of FIG. 4 are schematic views showing the positions where the laser luminous flux L entering the light quantity sensor 16 and BD 6 is reflected by the reflecting surface 12 of the rotatable polygon mirror 4. Part (a) of FIG. 4 shows the position where the laser luminous flux L entering the light quantity sensor 16 is reflected by the rotatable polygon mirror 4. Part (b) of FIG. 4 shows the position where the laser luminous flux L entering the BD 6 is reflected by the rotatable polygon mirror 4. A corner 15 indicates the corner of the reflecting surface 12 of the rotatable polygon mirror 4.

The rotatable polygon mirror 4 rotates in the direction of arrow A in parts (a) and (b) of FIG. 4, and the laser luminous flux L reflected by the reflecting surface 12 of the rotatable polygon mirror 4 scans over the sensor in the order of the light quantity sensor 16 and BD 6. The distance between the position where the laser luminous flux L is reflected by the reflecting surface 12 of the rotatable polygon mirror 4 and the corner 15 of the rotatable polygon mirror 4 is represented as distance ca in part (a) of FIG. 4 and distance cb in part (b) of FIG. 4. In this case, $$ca<cb$$

and the laser luminous flux L of the light quantity sensor 16, which is located upstream in the main scanning direction, is more reflected at the edge (near corner 15) of the reflecting surface 12 of the rotatable polygon mirror 4. In other words, the laser luminous flux L received by the light quantity sensor 16 is affected by the edge of the reflecting surface 12 of the rotatable polygon mirror 4.

<Relation Between Air Flow and Adhering Dirt>

Parts (c) and (d) of FIG. 4 show the air flow in the vicinity of the rotatable polygon mirror 4 as it rotates and the dirt that adheres to the reflecting surface 12. Part (c) of FIG. 4 shows the rotatable polygon mirror 4 viewed from above, and part (d) of FIG. 4 shows the reflecting surface 12 viewed from the front.

As shown in part (c) of FIG. 4, when the rotatable polygon mirror 4 rotates in the direction indicated by arrow A, an air flow as shown in W occurs near the corner 15 of the reflecting surface 12. As a result, dust in the air adheres near the corner 15 of the reflecting surface 12, indicated by the area Y in part (d) of FIG. 4. If the light quantity sensor 16 is placed upstream from the BD 6 with respect to the scanning portion of the laser luminous flux L, the laser luminous flux L reflected at the edge of the reflecting surface 12 (near area Y) of the rotatable polygon mirror 4, where the reflectivity tends to decrease, will be introduced to the light quantity sensor 16. As a result, a decrease in reflectivity of the rotatable polygon mirror 4 can be detected more accurately by the light quantity sensor 16.

As explained in FIG. 3, when the pulse width tp1 is measured in the initial state (graph a) where the reflecting surface 12 is clean, the pulse width tp1 is stored in a storage medium (not shown), for example, in RAM 100*c*, that the image forming apparatus has. Here, the memory portion may be a RAM 100*c*, and the control portion 100 stores the measured pulse width tp1 in the RAM 100*c*. The control portion 100 then measures the pulse width tp2 for each certain number of printed sheets. The pulse width tp2 may be measured for each number of sheets printed, or at each elapse of a predetermined time, or at any other timing.

It is possible to determine in advance by experiment or other means how the light quantity distribution in the main scanning direction on the photosensitive drum 8 shifts from the initial uniform state due to the reduced reflectance of the rotatable polygon mirror 4. The results obtained by experiments, etc. can be stored in the ROM 100*b* in advance and used to correct the light quantity. Here, the results obtained by experiments, etc. may be, for example, as follows. It may be a table that associates the pulse width tp1 with the position in the main scanning direction and the initial light quantity at that position, a table that associates the pulse width tp2 at a given timing with the position in the main scanning direction and the light quantity at that position at that timing, and so on. The control portion 100 can estimate the light quantity distribution on the photosensitive drum 8 based on the information stored on the ROM 100*b* from the measured pulse width tp2 value, and can change the light quantity of the laser luminous flux L during scanning to bring the light quantity distribution closer to the initial uniform state. By measuring the pulse width tp2 and changing the light quantity during scanning, the light quantity distribution on the photosensitive drum 8 can be corrected, thereby suppressing the phenomenon of lightening of the density of printed matter that occurs over time.

<Detection Method for the Sub-Scanning Direction Position of the Laser Luminous Flux L>

If printing is continued continuously, the temperature inside and around the optical scanning device 101 rises, and the optical box 9 is deformed. The deformation of the optical box 9 changes the posture of the semiconductor laser unit 1 and the anamorphic collimator lens 2, and the scanning position of the laser luminous flux L on the light quantity sensor 16 and on the photosensitive drum 8 in the sub-scanning direction.

When the position of the laser luminous flux L passing on the light quantity sensor 16 moves away from the center of the sub-scanning direction, the amount of light entering the light-receiving surface 17 becomes smaller, resulting in a smaller pulse width, similar to the principle explained in FIG. 3. Since the position in the sub-scanning direction shifts vertically or horizontally when the temperature rises depends on the shape of the optical box 9, it can be determined in advance through experiments or other means. The shift of the position in the sub-scanning direction obtained by experiments, etc., can be stored in the ROM 100*b* in advance and used to correct the shift of the position in the sub-scanning direction.

Similar to the detection method for the position of the laser luminous flux L in the sub-scanning direction of the rotatable polygon mirror 4, the control portion 100 first stores the initial pulse width tp1 in, for example, the RAM 100*c*. Then, the pulse width tp2 is detected at regular intervals, for example, from the time the power source of the image forming apparatus is turned on until the power source is turned off, and the control portion 100 compares the pulse width tp1 with the pulse width tp2. This allows the detection of changes in the scanning position in the sub-scanning direction on the BD 6.

The scanning position in the sub-scanning direction on the BD 6 is correlated with the scanning position in the sub-scanning direction on the photosensitive drum 8. Therefore, the control portion 100 can estimate the scanning position in the sub-scanning direction on the photosensitive drum 8 from the scanning position in the sub-scanning direction on the BD 6 by knowing the relationship equation in advance. Based on the estimated scanning position in the sub-scanning direction on the photosensitive drum 8, the control portion 100 can, for example, correct the image writing timing in the sub-scanning direction by one line when the scanning position in the sub-scanning direction deviates by more than half of the scanning interval on the surface of the recording material. Here, half of the scanning interval is, for example, 21.2 μm (=25.4 cm/600 dpi/2) when the resolution in the sub-scanning direction is 600 dpi. From the above, by correcting the writing timing of the laser luminous flux L on the photosensitive drum 8 in the sub-scanning direction, the effect of the misalignment of the scanning position of the laser luminous flux L on the image margins can be eliminated.

The light quantity correction is based on the long-term pulse width tp2 change, and the laser luminous flux L positional deviation in the sub-scanning direction can be detected by detecting the short- to medium-term pulse width tp2 change, such as from the power source of the image forming apparatus from power on to power off. Therefore, the control portion 100 can perform the light quantity correction and the correction of the position in the sub-scanning direction in parallel.

In Embodiment 1, image degradation can be prevented by detecting and correcting the decrease in reflectance of the reflecting surface 12 of the rotatable polygon mirror 4 with the light quantity sensor 16 while the image forming apparatus (in other words, the optical scanning apparatus) is in operation. In addition, by detecting the misalignment in the sub-scanning direction on the photosensitive drum 8 and correcting the writing timing in the sub-scanning direction, it is possible to prevent image margin shift. In other words, the control portion 100 corrects the light quantity of the laser luminous flux L emitted from the light source based on the light quantity detected by the light quantity sensor 16. The control portion 100 also corrects the deviation of the position (scanning portion) where the laser luminous flux L scans in the sub-scanning direction based on the light quantity detected by the light quantity sensor 16. The correction of the light quantity and the correction of the displacement of the scanning position in the sub-scanning direction are the same for the subsequent embodiments.

According to the above embodiment 1, changes over time in the rotatable polygon mirror of the optical scanning device can be detected even while the device is in operation, and high image quality can be achieved while suppressing image degradation over time.

In other words, with a simple configuration, a decrease in reflectance, etc. of the rotatable polygon mirror of the optical scanning device can be detected during operation of the image forming apparatus (in other words, the optical scanning device), and correction of such changes is also possible. As a result, image degradation over time can be suppressed, contributing to a longer service life of the image forming apparatus. In addition, the simple configuration also makes it possible to detect misalignment of the scanning position in the sub-scanning direction on the surface to be scanned, thereby achieving higher image quality of the output image of the image forming apparatus.

Embodiment 2

<BD>

FIG. 5 is a perspective explanatory view showing the configuration near the BD 6 of the optical scanning device 102 of Embodiment 2. In the line showing the laser luminous flux L in FIG. 5, the dashed line represents the optical path on the other side of the BD lens 14, which does not interfere with the BD lens 14. Embodiment 2 differs from Embodiment 1 in that the optical box 9 has a reflecting surface 21 and that the BD 6 also serves as a light quantity sensor. Here, the BD 6 has a light-receiving surface 10 and is provided upstream in the main scanning direction from a scanning lens 7. The BD 6 functions as an output unit that outputs a signal in response to the reception of the laser luminous flux L input through the BD lens 14 at the light-receiving surface 10. The BD 6 also detects the light quantity of the laser luminous flux L upstream in the main scanning direction from the BD lens 14, which is input without (without through) the BD lens 14. In Embodiment 2, the laser luminous flux L not via the BD lens 14 is input to the light-receiving surface 10, and then the laser luminous flux L via the BD lens 14 is input to the light-receiving surface 10. In other words, each laser luminous flux L is input to the light-receiving surface 10 with a time difference. The control portion 100 controls the light source based on the light quantity of the laser luminous flux L input to the light-receiving surface 10 without going through the BD lens 14. The same configuration as in embodiment 1 is marked with the same symbols and omitted from the description.

When the rotatable polygon mirror 4 is in a certain rotational phase, the laser luminous flux L is reflected by the reflecting surface 21 integrated with the optical box 9 and enters the light-receiving surface 10 of the BD 6 without passing through the lenses and other components including the BD lens 14. In other words, the reflecting surface 21 integrated with the optical box 9, which is a reflecting member, reflects the laser luminous flux L scanned by the rotatable polygon mirror 4 and guides it to the light-receiving surface 10 of the BD 6 without passing through the BD lens 14. Since the laser luminous flux L does not pass through the lens, etc., the shape of the laser luminous flux L as it scans the light-receiving surface 10 is elliptical, similar to the elliptical shape Sp shown in part (b) of FIG. 2. Therefore, the same method as that shown in FIG. 3 can be used to detect the decrease in reflectance of the rotatable polygon mirror 4 and the scanning position in the sub-scanning direction. In other words, in Embodiment 2, the control portion 100 can correct the light quantity and the scanning position in the sub-scanning direction based on the pulse widths tp1 and tp2 from the detection results of the BD 6.

The rotatable polygon mirror 4 then rotates in the direction of arrow A in FIG. 1, and the laser luminous flux L is scanned in the direction of arrow B in FIG. 5 and enters the BD lens 14. The laser luminous flux L passing through the BD lens 14 is focused and enters the light-receiving surface 10 of the BD 6. At this time, the luminous flux is detected by the BD 6, and this timing is used as the synchronous detection timing of the writing position in the main scanning direction.

The reflecting surface 21 is, for example, a mirror with a metallic film or dielectric multilayer deposited on the optical box 9. The reflecting surface 21 may also be a highly reflective sheet attached to the optical box 9. Furthermore, the surface of the optical box 9 itself may be used. However, even if the surface of the optical box 9 is used as is, the reflecting surface 21 must have a reflectance of 30% or higher for the following reasons.

Since the light quantity when writing light on the surface of the photosensitive drum 8 varies depending on the temperature and humidity environment surrounding the image forming apparatus, the thickness of the photosensitive drum 8, etc., the minimum and maximum values of the light quantity usage range are preferably minimum/maximum≤½. The light quantity sensor may not be able to accurately measure the light quantity if it falls below 15% of the maximum incoming light quantity. Therefore, minimum/maximum value×reflectance≥15% must be satisfied. Therefore, a reflectance of 30% or more is required.

<Relation Between Incident Angle and Reflectance>

Part (a) of FIG. 6 shows the incident angle dependence of reflectance of PMMA (Poly Methyl Methacrylate) (polymethyl methacrylate resin), a commonly used resin. Part (a) of FIG. 6 shows the incident angle (° (degree)) on the horizontal axis and reflectance (%) on the vertical axis. Here, the incident angle is the angle that the incident light makes with the normal of the reflecting surface 21. The thick solid line shows the incident angle dependence on the reflectance Rs of S-polarized light, and the thin solid line shows the incident angle dependence on the reflectance Rp of P-polarized light.

In the optical scanning device 102 of Embodiment 2, as described above, the optical box 9 is made of resin mixed with various materials to increase its strength. Therefore, part (a) of FIG. 6 is not strictly equivalent to the incident angle dependence of the reflectance of the optical box 9, but it can be considered to be roughly equivalent. From part (a) of FIG. 6, it can be seen that the incident angle of the laser luminous flux L on the reflecting surface 12 must be at least 70° for S-polarized light and 80° for P-polarized light in order to satisfy a reflectance of 30% or more.

<Output Light of Semiconductor Laser>

Part (b) of FIG. 6 shows the semiconductor laser 22 encapsulated in the semiconductor laser unit 1 of FIG. 1. The output light of the semiconductor laser 22 is linearly polarized as shown by the dashed line in part (b) of FIG. 6. The semiconductor laser 22 can rotate in the arrow Z direction. Therefore, by rotating the semiconductor laser 22 as indicated by the arrow Z in part (b) of FIG. 6, the ratio of S-polarization and P-polarization of the laser luminous flux L to the reflecting surface 21 can be adjusted. In Embodiment 2, the semiconductor laser 22 is rotated so that it reflects mostly S-polarized light. In other words, the semiconductor laser 22 can be rotated and adjusted so that the laser luminous flux L reflected by the reflecting surface 21 has a larger proportion of S-polarized light than P-polarized light.

This makes it possible to ensure the specified reflectance even when the reflecting surface 21 is configured with the optical box 9. In other words, in the incident angle dependence described above, it is not necessary to consider P-polarized light, and the incident angle should be 70° or higher.

In Embodiment 2, as described above, the BD 6 can also serve as a light quantity sensor, and with a simpler configuration, it is possible to detect a decrease in reflectance of the rotatable polygon mirror 4 and the scanning position in the sub-scanning direction while the image forming apparatus is in operation. Embodiment 2, as described above, can detect changes over time in the rotatable polygon mirror of the optical scanning device even while the device is in operation, and can achieve high image quality while suppressing image degradation over time.

Embodiment 3

<BD>

FIG. 7 is a perspective explanatory view showing the configuration near the BD 6 of the optical scanning device 103 of Embodiment 3. In the line showing the laser luminous flux L in FIG. 7, the dashed lines represent the optical path passing through the BD lens 14 and the optical path on the other side of the BD lens 14 that exits from the BD lens 14. Embodiment 3 differs from Embodiment 2 in that the lens end surface 24, which is a part of an end portion 23 of the BD lens 14 that does not have a lens function, plays the role of the reflecting surface 21 of Embodiment 2. In other words, the BD lens 14, which is the second optical component, has a first portion that focuses the laser luminous flux L scanned by the rotatable polygon mirror 4 in the main scanning direction to enter the light-receiving surface 10 of the BD 6. The BD lens 14 also has an end portion 23, which is the second portion that does not focus the laser luminous flux L scanned by the rotatable polygon mirror 4 in the main scanning direction and allows it to enter the light-receiving surface 10 of the BD 6.

The same configuration as in embodiment 1 is marked with the same symbols and omitted from the explanation.

When the rotatable polygon mirror 4 is in a certain rotation phase, the laser luminous flux L enters the end portion 23 of the BD lens 14, which does not have a lens function, reflects on the inner surface of the lens end surface 24 (reflecting in the direction of the light-receiving surface 10), and passes through the end portion 23 of the BD lens 14. Since the end portion 23 is a transparent member that does not have a lens function, the shape of the laser luminous flux L as it scans the light-receiving surface 10 is elliptical, similar to the elliptical shape Sp shown in part (b) of FIG. 2. Therefore, the same method as that shown in FIG. 3 can be used to detect the decrease in reflectance of the rotatable polygon mirror 4 and the scanning position in the sub-scanning direction. In other words, in Embodiment 3, the control portion 100 can correct the light quantity and the scanning position in the sub-scanning direction based on the pulse widths tp1 and tp2 from the detection results of the BD 6.

If the rotatable polygon mirror 4 then rotates and the laser luminous flux L passes through the BD lens 14, the laser luminous flux L enters the light-receiving surface 10 of the BD 6 in a focused state, as in the method shown in part (a) of FIG. 2. At this time, the luminous flux is detected by the BD 6, and this timing is used as the synchronous detection timing of the writing position in the main scanning direction. The lens end surface 24 is, for example, a mirror with a metallic film or dielectric multilayer film deposited on the end surface of the BD lens 14. The lens end surface 24 may also be made of a highly reflective sheet attached to the end surface.

In embodiment 3, the BD lens 14 is provided with a lens end surface 24 that does not have a lens function, allowing design freedom in the shape around the BD lens 14 and enabling the design of a more compact scanning optical device. According to the above embodiment 3, it is possible to detect changes over time in the rotatable polygon mirror of the optical scanning device even while the device is in operation, and to achieve high image quality while suppressing image degradation over time.

Embodiment 4

[Description of the Laser Beam Printer]

FIG. 8 is a schematic configuration of a laser beam printer as a configuration example of an image forming apparatus. A laser beam printer 1000 (hereinafter referred to as "printer 1000") is equipped with a photosensitive drum 1010, a charging portion 1020, and a developing portion 1030, as a developing unit. The photosensitive drum 1010 is an image bearer on which an electrostatic latent image is formed, and corresponds to the photosensitive drum 8 of embodiments 1 to 3. The charging portion 1020 uniformly charges the photosensitive drum 1010. An optical scanning device 1025, which is an exposure unit, forms an electrostatic latent image by scanning a laser light on the photosensitive drum 1010 in accordance with image data. The optical scanning device 1025 is shown in simplified form in FIG. 8. The optical scanning device 1025 corresponds to the optical scanning device 101 of Embodiment 1, the optical scanning device 102 of Embodiment 2, and the optical scanning device 103 of Embodiment 3. The developing portion 1030 develops the electrostatic latent image formed on the photosensitive drum 1010 with toner, a developer, to form a toner image, a developer image.

The toner image formed on the photosensitive drum 1010 (on the photosensitive member) is transferred to a sheet P as recording material supplied from a cassette 1040 by a transfer portion 1050, which is the transfer unit. The unfixed toner image transferred to the sheet P is fixed by a fixing unit 1060 and discharged to a discharge tray 1070. The photosensitive drum 1010, charging portion 1020, developing portion 1030, and transfer portion 1050 are an image forming portion. The printer 1000 is also equipped with a power supply portion 1080, and power is supplied from the power supply portion 1080 to driving portions such as motors and to a control portion 5000. The control portion 5000 has a CPU (not shown) and controls the image forming operations by the image forming portion and the sheet P transport operations. The control portion 5000 may correspond to the control portion 100 of embodiments 1 to 3.

After a predetermined time elapses when the printer 1000 finishes a print operation, it transitions to a standby state in which the print operation can be immediately executed. After another predetermined time elapses, the printer 1000 transitions from the standby state to a sleep state, a low power consumption mode, in order to reduce power consumption during standby time. The printer 1000 has three states: the sleep state, which is the second mode, the standby state, and the print state, which is the first mode, and the control portion 5000 makes the printer transition to each state. The image forming apparatus to which the optical scanning devices 101, 102, and 103 of Embodiments 1 to 3 can be applied is not limited to the configuration shown in FIG. 8.

According to the above Embodiment 4, it is possible to detect changes over time in the rotatable polygon mirror of the optical scanning device even while the device is in operation, and to achieve high image quality while suppressing image degradation over time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-201923 filed on Dec. 19, 2022, which is hereby incorporated by reference herein in its entirety.

What is claimed is:

1. An optical scanning device comprising:

a light source configured to emit a luminous flux;

a rotatable polygon mirror configured to deflect the luminous flux emitted from the light source and scan in a main scanning direction;

an optical member configured to guide the luminous flux scanned by the rotatable polygon mirror to an image bearing member;

a beam detector provided on an upstream side of the optical member in the main scanning direction and configured to output a synchronization signal corresponding to receiving the luminous flux, the synchronization signal being used to determine a writing start position on the image bearing member in the main scanning direction;

a light quantity detecting unit provided on the upstream side of the beam detector in the main scanning direction and configured to detect a light quantity of the luminous flux; and a control unit configured to control the light source based on the signal outputted from the beam detector and the light quantity detected by the light quantity detecting unit, wherein the light quantity detecting unit and the beam detector are arranged such that, during scanning by a same reflecting surface of the rotatable polygon mirror, the luminous flux reflected by the same reflecting surface scans over the light quantity detecting unit before scanning over the beam detector in the main scanning direction, wherein the luminous flux reaching the light quantity detecting unit is reflected at a position closer to an end portion of a reflecting surface of the rotatable polygon mirror with respect to the main scanning direction than the luminous flux reaching the beam detector, and wherein the light quantity detecting unit outputs a pulse signal having a pulse width corresponding to a period during which the detected light quantity exceeds a threshold, and the control unit detects deterioration of reflectance of the reflecting surface based on a change in the pulse width and corrects a light quantity of the luminous flux emitted from the light source based on the detected deterioration.

2. An optical scanning device according to claim 1, wherein the optical member is defined as a first optical member, and further comprising a second optical member provided between the rotatable polygon mirror and the beam detector, and configured to guide the luminous flux scanned by the rotatable polygon mirror not to the light quantity detecting unit but to the beam detector.

3. An optical scanning device according to claim 1, wherein the control unit corrects the light quantity of the luminous flux emitted from the light source based on pulse width.

4. An optical scanning device according to claim 1, wherein the control unit corrects a deviation of a position where the luminous flux scans in a sub-scanning direction perpendicular to the main scanning direction based on the pulse width.

5. An optical scanning device according to claim 1, wherein the control unit corrects a writing start position on the image bearing member in the main scanning direction based on the synchronization signal outputted from the beam detector.

6. An optical scanning device comprising:

a light source configured to emit a luminous flux;

a rotatable polygon mirror configured to deflect the luminous flux emitted from the light source and scan in a main scanning direction;

a first optical member configured to guide the luminous flux scanned by the rotatable polygon mirror to an image bearing member;

a second optical member provided on an upstream side of the first optical member in the main scanning direction;

an output unit provided on the upstream side of the first optical member in the main scanning direction and configured to output a signal corresponding to receiving the luminous flux which is scanned by the rotatable polygon mirror and condensed in the main scanning direction by the second optical member;

a reflecting member provided on the upstream side of the second optical member in the main scanning direction and configured to reflect the luminous flux scanned by the rotatable polygon mirror and guide to the output unit without passing through the second optical member; and a control unit configured to control the light source based on the signal outputted from the output unit, wherein the output unit detects a light quantity of the luminous flux which is the upstream side, in the main scanning direction, of the luminous flux condensed in the main scanning direction by the second optical member and which is not condensed in the main scanning direction, and wherein the control unit controls the light quantity of the luminous flux not condensed in the main scanning direction.

7. An optical scanning device according to claim 6, further comprising an optical box configured to accommodate the rotatable polygon mirror, the first optical member and the second optical member, wherein the reflecting member is provided integrally with the optical box.

8. An optical scanning device according to claim 7, wherein a reflectance of the reflecting member is 30% or more.

9. An optical scanning device according to claim 8, wherein an incident angle at which the luminous flux scanned by the rotatable polygon mirror enters the reflecting member is 70° or more.

10. An optical scanning device according to claim 9, wherein the light source is rotatable and adjustable about an optical axis, and wherein the light source is rotatably adjusted about the optical axis so that a ratio of a s-polarized light in the luminous flux reflected by the reflecting member is larger than a ratio of a p-polarized light in that.

11. An optical scanning device, comprising:

a light source configured to emit a luminous flux;

a rotatable polygon mirror configured to deflect the luminous flux emitted from the light source and scan in a main scanning direction;

a first optical member configured to guide the luminous flux scanned by the rotatable polygon mirror to an image bearing member;

a second optical member provided on an upstream side of the first optical member in the main scanning direction;

an output unit provided on the upstream side of the first optical member in the main scanning direction and configured to output a signal corresponding to receiving the luminous flux which is scanned by the rotatable polygon mirror and condensed in the main scanning direction by the second optical member; and a control unit configured to control the light source based on the signal outputted from the output unit, wherein the output unit detects a light quantity of the luminous flux which is the upstream side, in the main scanning direction, of the luminous flux condensed in the main scanning direction by the second optical member and which is not condensed in the main scanning direction, wherein the control unit controls the light quantity of the luminous flux not condensed in the main scanning direction, and wherein the second optical member includes a first portion configured to cause the luminous flux scanned by the rotatable polygon mirror to condense in the main scanning direction and to enter the output unit, and a second portion provided on the upstream side of the first portion in the main scanning direction and configured to cause the luminous flux scanned by the rotatable polygon mirror not to condense in the main scanning direction and to enter the output unit.

12. An optical scanning device according to claim 6, wherein, of the luminous flux reaching the output unit, the luminous flux not condensed in the main scanning direction is reflected at a position closer to an end portion of a reflecting surface of the rotatable polygon mirror with respect to the main scanning direction than the luminous flux condensed in the main scanning direction by the second optical member.

13. An optical scanning device according to claim 6, wherein the rotatable polygon mirror includes a reflecting surface configured to reflect the luminous flux, wherein the output unit detects a deterioration of a reflectance of the reflecting surface by detecting the light quantity of the luminous flux not condensed in the main scanning direction, and wherein the control unit corrects the light quantity of the luminous flux emitted from the light source based on the light quantity of the luminous flux not condensed in the main scanning direction.

14. An optical scanning device according to claim 6, wherein the control unit corrects a deviation of a position where the luminous flux scans in a sub-scanning direction perpendicular to the main scanning direction based on the light quantity of the luminous flux not condensed in the main scanning direction.

15. An optical scanning device according to claim 6, wherein the control unit corrects a writing start position on the image bearing member in the main scanning direction based on the signal outputted from the output unit.

* * * * *